April 11, 1939.    A. G. ZIMMERMAN    2,154,080
GALVANOMETER MOUNT FOR SOUND RECORDING APPARATUS
Filed June 18, 1938

Inventor
Arthur G. Zimmerman
By
Attorney

Patented Apr. 11, 1939

2,154,080

UNITED STATES PATENT OFFICE 2,154,080

GALVANOMETER MOUNT FOR SOUND RECORDING APPARATUS

Arthur G. Zimmerman, Indianapolis, Ind., assignor to Radio Corporation of America, a corporation of Delaware Application June 18, 1938, Serial No. 214,510

4 Claims. (Cl. 248—278)

This invention relates to a galvanometer mount for sound recording apparatus and, more particularly, to an adjustable mount for supporting the galvanometer in a sound film recorder in such a manner that the adjustment thereof can be readily changed or the galvanometer position may be temporarily changed without changing the permanent adjustment thereof.

In sound recording apparatus of what is commercially known as the RCA Photophone type, a beam of light is directed to a galvanometer upon which the sounds to be recorded are electrically impressed, and the beam of light is deflected by the galvanometer in accordance with the electrical impulses. This beam, after deflection, is passed through a slit and is thereafter directed to a light sensitive film upon which the sound record is produced.

The type of galvanometer used in such apparatus is shown and described, for example, in Dimmick Patent No. 1,936,833, issued November 28, 1933. This galvanometer is used in conjunction with various types of sound recording optical systems which may be used to produce the singly modulated variable area record, the symmetrical type variable area record, Class A or Class B push-pull records of either variable area or variable density, etc. In all such uses, however, it is desirable to have the galvanometer accurately adjustable and also to have it movable during intervals between recording for the reason that it is necessary to secure a full width exposure of the sound track at maximum intensity between sound recordings to obtain test strips for checking the characteristics of the photographic emulsion used.

The galvanometer mount of the present invention provides accurate location of the galvanometer for recording and provides also means for readily shifting the galvanometer between recordings for obtaining the aforesaid test strips and, at the same time, insuring the accurate repositioning of the galvanometer after the test strip has been produced.

One object of the invention is to provide an extremely rigid galvanometer mount.

Another object of the invention is to provide a galvanometer mount which is capable of extremely precise adjustment.

Another object of the invention is to provide a galvanometer mount which has a minimum tendency to vibrate.

Another object of the invention is to provide a galvanometer mount wherein the galvanometer is readily movable a predetermined distance about one axis.

Figure 1:
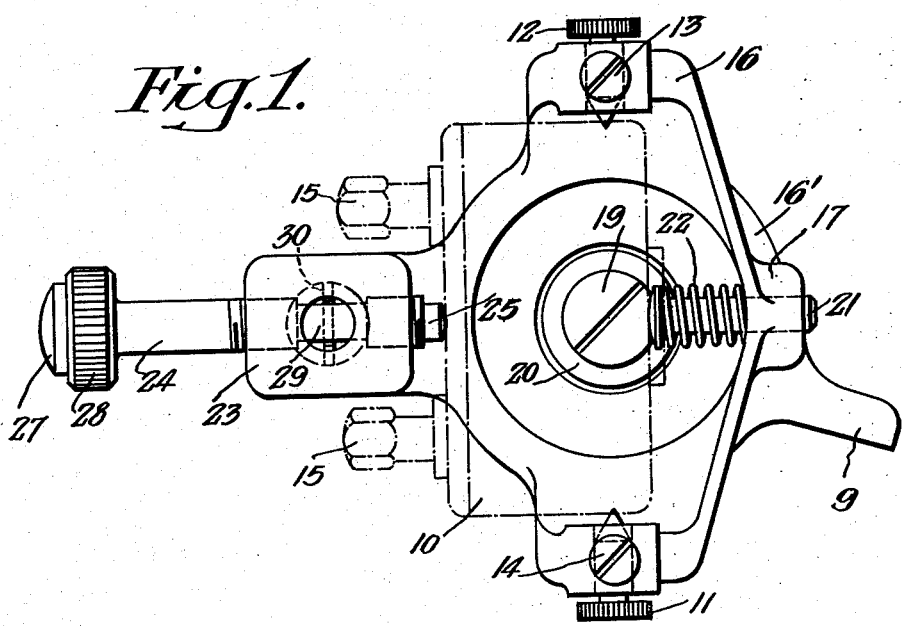
Figure 2:
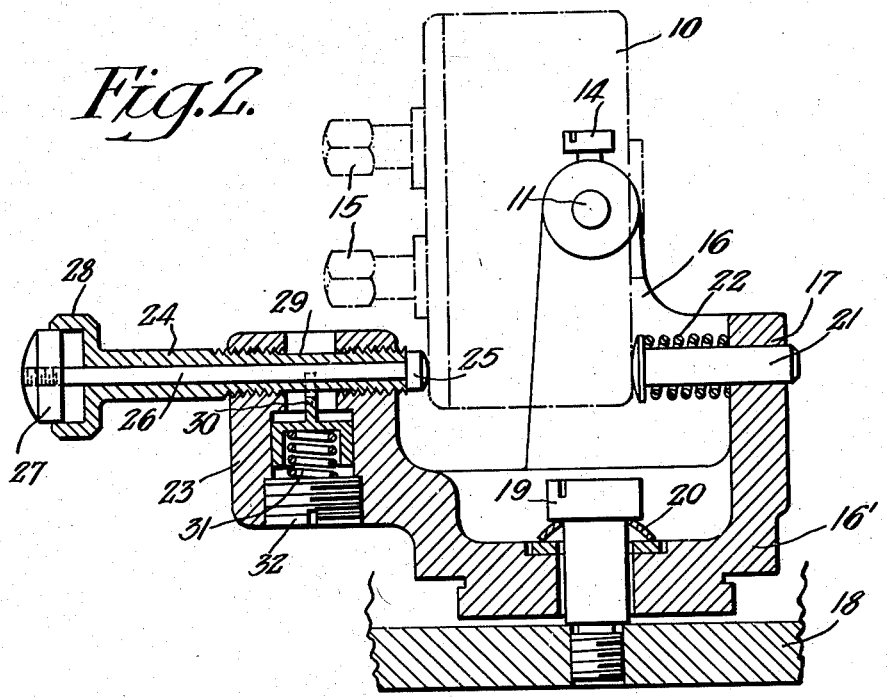

Other and incidental objects of the invention will be apparent to those skilled in the art from a reading of the following specification and an inspection of the accompanying drawing in which Figure 1 is a top view of the improved galvanometer mount, and Figure 2 is a side view taken from the bottom of Fig. 1.

Referring first to Fig. 1, the galvanometer 10, which is indicated in dash lines, in supported for movement about a horizontal axis on the screws 11 and 12 which pass through the yoke 16 and which may be clamped in place by the set screws 13 and 14. This yoke 16 is preferably made as a single casting including the base 16', the front member 17 and the rear member 23. This whole unit is secured to the bed 18 of the recording instrument by an appropriate screw 19 which bears upon the spring washer 20 thereby yieldably urging the base 16' into frictional engagement with the bed of the recorder 18. The entire galvanometer mount may be rotated about the screw 19 as an axis for lateral adjustment by an appropriate adjusting mechanism on the recorder engaging with the extending arm 9. The galvanometer 10 is provided with appropriate terminals 15 to which the wires carrying audio impulses to the galvanometer may be attached.

Referring now more particularly to Fig. 2, the slidable pin 21 passes through a hole in the front member 17 of the galvanometer support and is urged against the face of the galvanometer by an appropriate helical spring 22, thereby tending to rotate the galvanometer in a clockwise direction about its horizontal axis in Fig. 2. This tendency to rotate is opposed by the screw 24, which is threaded into the rear portion 23 of the galvanometer mount and which engages the back of the galvanometer through the rounded head 25. The position of the galvanometer about its horizontal axis is adjusted by rotating the screw 24 by means of its knurled head 28, permitting the lower portion of the galvanometer to be forced in one direction or the other by the screw 24 or the spring 22.

In order to rotate the galvanometer in a counter-clockwise direction for exposing the test strips, the rounded member 25 is made integral with a spindle 26 which, in turn, is secured in an appropriate fashion to a push button 27. The knurled head 28 is provided with a circular depression of such diameter and depth that the push button 27 may be forced into this depression, thereby forcing the rounded head 25 away from the end of the adjusting screw 24 and rotating the galvanometer counterclockwise an amount determined by the range of movement of the push button 27. It will be apparent that when the push button 27 is released the rounded head 25 is again forced into contact with the end of the screw 24 by the spring 22 thus restoring the galvanometer exactly to its original position.

In order to prevent the screw 24 from travelling too far in either direction, it is reduced in diameter as indicated at 29, and this reduced portion is engaged by a member 30 which, in turn, is urged toward the screw 24 by the helical spring 31 secured in place by the screw plug 32. When the screw 24 reaches the limit of its movement in either direction, the threaded portion thereof engages the member 30, thereby preventing further movement.

It will be apparent that the foregoing apparatus provides a very precise adjustment of the galvanometer about its horizontal axis, together with means for easily and quickly deflecting the galvanometer from its adjusted position to a second predetermined position for the exposure of test strips and for again restoring it exactly to its original position.

Having now described my invention, I claim:

1. A galvanometer mount including means for supporting a galvanometer for rotation about a horizontal axis, spring means urging the galvanometer in one direction about said axis, adjusting means opposing said spring means and maintaining said galvanometer in fixed position, and movable means carried by said adjusting means and abutting thereagainst for moving said galvanometer away from said adjusting means.

2. A galvanometer mount including means for supporting a galvanometer for rotation about a horizontal axis, spring means urging the galvanometer in one direction about said axis, adjusting means opposing said spring means and maintaining said galvanometer in fixed position, and movable means carried by said adjusting means and abutting thereagainst for temporarily moving said galvanometer away from said adjusting means a predetermined amount.

3. A galvanometer mount including means for supporting a galvanometer for rotation about a horizontal axis, spring means urging the galvanometer in one direction about said axis, screw means opposing said spring means and maintaining said galvanometer in fixed position, and movable means carried by said screw means and abutting thereagainst for moving said galvanometer away from said screw means.

4. A galvanometer mount including means for supporting a galvanometer for rotation about a horizontal axis, spring means urging the galvanometer in one direction about said axis, screw means opposing said spring means and maintaining said galvanometer in fixed position, and movable means carried by said screw means and abutting thereagainst for temporarily moving said galvanometer away from said screw means a predetermined amount.

ARTHUR G. ZIMMERMAN.